US011409821B1

(12) United States Patent
Pal et al.

(10) Patent No.: US 11,409,821 B1
(45) Date of Patent: Aug. 9, 2022

(54) RECOMMENDING CONTENT TO SUBSCRIBERS

(71) Applicant: Pinterest, Inc., San Francisco, CA (US)

(72) Inventors: Aditya Pal, San Jose, CA (US); Chantat Eksombatchai, Sunnyvale, CA (US); Yitong Zhou, Sunnyvale, CA (US); Bo Zhao, Menlo Park, CA (US); Charles Joseph Rosenberg, Cupertino, CA (US); Jurij Leskovec, Stanford, CA (US)

(73) Assignee: Pinterest, Inc., San Francisco, CA (US)

( * ) Notice: Subject to any disclaimer, the term of this patent is extended or adjusted under 35 U.S.C. 154(b) by 8 days.

(21) Appl. No.: 16/909,894

(22) Filed: Jun. 23, 2020

(51) Int. Cl.
*G06F 16/9535* (2019.01)
*G06F 16/906* (2019.01)

(52) U.S. Cl.
CPC ........ *G06F 16/9535* (2019.01); *G06F 16/906* (2019.01)

(58) Field of Classification Search
CPC ........................... G06F 16/9535; G06F 16/906
See application file for complete search history.

(56) References Cited

U.S. PATENT DOCUMENTS

| 2017/0171580 A1* | 6/2017 | Hirsch | H04N 21/6125 |
| 2020/0107077 A1* | 4/2020 | Einaudi | G06F 16/7844 |
| 2021/0019342 A1* | 1/2021 | Peng | G06F 16/583 |

OTHER PUBLICATIONS

Bouhlel, N. et al., 2020. Visual Re-Ranking via Adaptive Collaborative Hypergraph Learning for Image Retrieval. In Advances in Information Retrieval. Springer International Publishing, https://link.springer.com/content/pdf/10.1007%2F978-3-030-45439-5_34.pdf, 16 pages.
Carvalho, M. et al. 2018. Cross-Modal Retrieval in the Cooking Context: Learning Semantic Text-Image Embeddings. In The 41st International ACM SIGIR Conference on Research & Development in Information Retrieval (SIGIR '18), https://arxiv.org/pdf/1804.11146.pdf, 10 pages.

(Continued)

*Primary Examiner* — Jay A Morrison
(74) *Attorney, Agent, or Firm* — Athorus, PLLC

(57) ABSTRACT

Systems and methods for recommending content to an online service subscriber are presented. For each subscriber, content items that were the subject of the subscriber's prior interactions are projected, via associated embedding vectors, into a content item embedding space. The content items, via their projections into the content item embedding space, are clustered to form a plurality of interest clusters for the subscriber. A representative embedding vector is determined for each interest cluster, and a plurality of these embedding vectors are stored as the representative embedding vectors for the subscriber. The online service, in response to a request for recommended content for a subscriber, selects a first representative embedding vector associated with the subscriber and identifies a new content item from a corpus of content items according to a similarity measure between the first representative embedding vector and an embedding vector associated with the new content item.

20 Claims, 8 Drawing Sheets

(56) References Cited

OTHER PUBLICATIONS

Chen, X. et al., 2019. Personalized Fashion Recommendation with Visual Explanations Based on Multimodal Attention Network: Towards Visually Explainable Recommendation. In Proceedings of the 42nd International ACM SIGIR Conference on Research and Development in Information Retrieval (SIGIR'19), http://www.yongfeng.me/attach/chen-sigir2019.pdf, 10 pages.

Formal, T. et al., 2020. Learning to Rank Images with Cross-Modal Graph Convolutions. In Advances in Information Retrieval. Springer International Publishing, https://link.springer.com/content/pdf/10.1007%2F978-3-030-45439-5_39.pdf, 16 pages.

Friedman, J. H., 2002. Stochastic Gradient Boosting. Computational Statistics & Data Analysis (2002), https://www.researchgate.net/profile/Jerome_Friedman/publication/222573328_Stochastic_Gradient_Boosting/links/5afe22f2aca272b5d84a992d/Stochastic-Gradient-Boosting.pdf?origin=publication_detail, 11 pages.

Hippocamplus, 2018, tSNE and clustering, Hippocamplus My Second Memory, Feb. 13, 2018 R STATS, https://monlong.github.io/Hippocamplus/2018/02/13/tsne-and-clustering/, 22 pages.

Lazaridou, A. et al., 2015. Combining Language and Vision with a Multimodal Skip-gram Model. In Proceedings of the 2015 Conference of the North American Chapter of the Association for Computational Linguistics: Human Language Technologies. Denver, Colorado, https://www.aclweb.org/anthology/N15-1016.pdf, 11 pages.

Lei, C. et al., 2016. Comparative Deep Learning of Hybrid Representations for Image Recommendations. In the IEEE Conference on Computer Vision and Pattern Recognition (CVPR), https://openaccess.thecvf.com/content_cvpr_2016/papers/Lei_Comparative_Deep_Learning_CVPR_2016_paper.pdf, 9 pages.

Niu, W. et al., 2018. Neural Personalized Ranking for Image Recommendation. In Proceedings of the Eleventh ACM International Conference on Web Search and Data Mining (WSDM '18), http://faculty.cse.tamu.edu/caverlee/pubs/niu18wsdm.pdf, 9 pages.

Norouzi, M. et al., 2012. Hamming Distance Metric Learning. In Advances in Neural Information Processing Systems, http://papers.nips.cc/paper/4808-hamming-distance-metric-learning.pdf, 9 pages.

Sivaramakrishnan, N. et al., 2020. A Deep Learning-Based Hybrid Model for Recommendation Generation and Ranking. Neural Computing & Applications (2020), https://repositorio.cuc.edu.co/bitstream/handle/11323/6456/Sivaramakrishnan2020_Article_ADeepLearning-basedHybridModel%20PRE.pdf?sequence=4&isAllowed=y, 22 pages.

\* cited by examiner

US 11,409,821 B1

RECOMMENDING CONTENT TO SUBSCRIBERS

BACKGROUND

As more and more people interact with network-accessible online services, these online services are implementing a type of recommender service that recommends content to a user/subscriber of the online service at one or more points during user interaction. Recommending interesting and engaging content to a subscriber is a key element in retaining subscribers, as well as increasing subscriber engagement.

By way of example, assume that an online service maintains and manages images and video content for its subscribers, and this content may be shared with other subscribers. When a subscriber accesses the online service, the online service (using a recommender service) may present new items of video or imagery (i.e., recommended content) to that subscriber when he/she accesses the online service, and at other times during the course of interaction with the online service.

As mentioned above, interesting and engaging recommended content is shown to be very important in retaining subscribers as well as increasing subscriber engagement. To be interesting and/or engaging, the recommended content should, in some ways, be related to some interest or activity of a subscriber. However, identifying interesting and engaging content for a given subscriber from among millions or billions of content items is a difficult challenge.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1A:
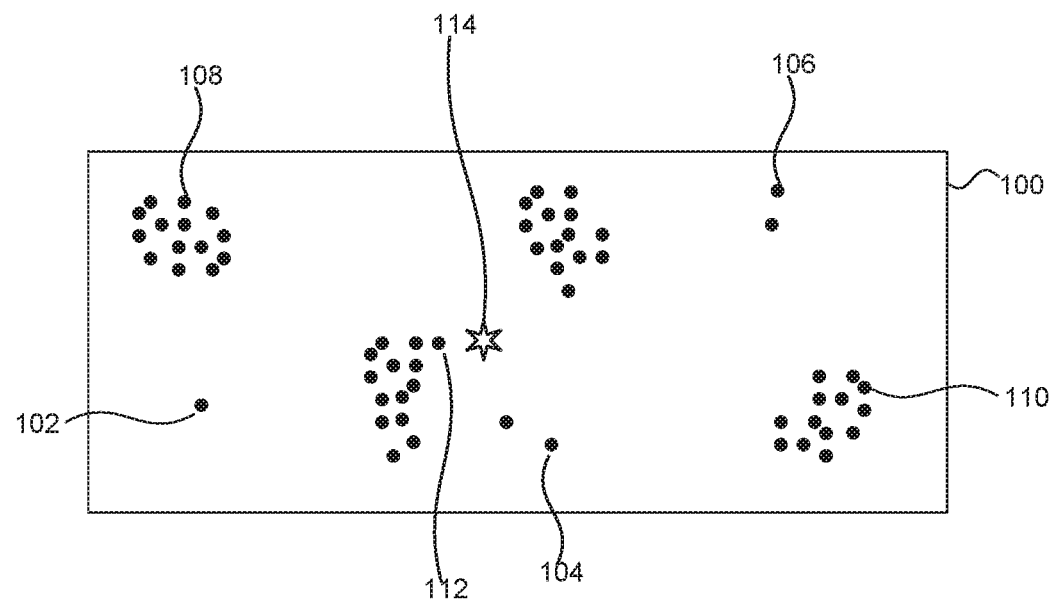
FIGS. 1A and 1B are pictorial diagrams for illustrating advantages of using multiple embedding vectors (representative embedding vectors) into an embedding space in recommending content to an online service's subscriber, according to aspects of the disclosed subject matter.

In accordance with various aspects and embodiments of the disclosed subject matter, systems and methods for recommending content to an online service subscriber are presented. A plurality of representative embedding vectors is generated for the subscribers of the online service. More particularly, for each subscriber, the content items that were the subject of the subscriber's prior interactions with the online service are projected, via associated embedding vectors, into a content item embedding space. The content items, via their projections into the content item embedding space, are clustered to form a plurality of interest clusters for the subscriber. A representative embedding vector is determined for each interest cluster, and a plurality of these embedding vectors are stored as the representative embedding vectors for the subscriber. The online service, in response to a request for recommended content for a subscriber, selects a first representative embedding vector associated with the subscriber and identifies a new content item from a corpus of content items according to a similarity measure between the first representative embedding vector and an embedding vector associated with the new content item.

In accordance with additional aspects and embodiments of the disclosed subject matter, a computer-executed method for recommending content items to a subscriber of an online service is set forth. A plurality of clusters of content items, of a corpus of content items, are determined based on prior activities of the subscriber with the online service. An embedding vector for each cluster is generated, with each generated embedding vector being representative of a corresponding cluster. These generated embedding vectors are associated with the subscriber and are stored as representative embedding vectors associated with the subscriber in a data store. In response to a request for recommended content from the subscriber, a first representative embedding vector of the representative embedding vectors associated with the subscriber is selected. A content item from the corpus of content items is then selected for recommendation to the subscriber as recommended content. More particularly, this content item is selected according to a similarity measure between the first representative embedding vector and an embedding vector of the selected content item. The selected content item is then presented to the subscriber as a recommended content item.

In accordance with additional aspects and embodiments of the disclosed subject matter, computer-executable instructions, embodied on computer-readable media, for conducting a method for recommending content items to a subscriber of an online service is presented. In execution, the method includes an online service maintaining a corpus of content items, where each content item has an associated embedding vector that projects the associated content item into a content item embedding space. Regarding a subscriber of the online service, a plurality of clusters of content items of the corpus of content items are determined. This plurality of clusters is determined based on prior activities of the subscriber with the recommender service. A representative embedding vector is generated for each cluster of the plurality of clusters, each generated embedding vector being a representative of a corresponding cluster. These representative embedding vectors are associated with the subscriber and stored in a data store. In response to a request from the subscriber for recommended content, a first representative embedding vector of the representative embedding vectors associated with the subscriber is selected. A content item from the corpus of content items is selected for recommendation to the subscriber. This content item is selected according to a similarity measure between the first representative embedding vector associated with the subscriber and an embedding vector of the selected content item. The selected content item is then presented to the subscriber as a recommended content item.

According to additional aspects of the disclosed subject matter, a computing system that provides content item recommendations in response to a query is presented. In execution, the computing system is configured to maintain a corpus of content items, each content item being associated with an embedding vector that projects an associated content item into a content item embedding space. A plurality of clusters of content items of the corpus of content items are determined according to a plurality of prior activities of a subscriber with a recommender service. The computing system generates an embedding vector for each cluster of a plurality of clusters, where each generated embedding vector is a representative embedding vector of a corresponding cluster. The generated representative embedding vectors are associated with the subscriber and stored in a data store. In response to receiving a request from the subscriber for recommended content, a first representative embedding vector of the representative embedding vectors associated with the subscriber is selected. With this first representative embedding vector, a content item from the corpus of content items is selected for recommendation to the subscriber. This content item is selected according to a similarity measure between the first representative embedding vector associated with the subscriber and an embedding vector of the selected content item. The selected content item is presented to the subscriber as a recommended content item.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "subscriber(s)" should be interpreted as one or more subscribers. Moreover, the use of the combination "and/or" with multiple items should be viewed as meaning either or both items.

By way of definition and as those skilled in the art will appreciate, an "embedding vector" is an array of values that reflect aspects and features of source/input content. For example, an embedding vector of an image will include an array of values describing aspects and features of that image. A process, referred to as an embedding vector generator, that generates an embedding vector for input content uses the same learned features to identify and extract information, the results of which leads to the generation of the embedding vector. Embedding vectors generated by the same process on the same source content type are comparable such that a greater the similarity between the embedding vectors of two source items (e.g., content items) indicates a greater similarity between the source items. By way of illustration and not limitation, an embedding vector may comprise 128 elements, each element represented by a 32- or 64-bit floating point value, each value representative of some aspect (or multiple aspects) of the input content. In other embodiments, the embedding vector may have additional or fewer elements and each element may have additional or fewer floating-point values, integer values, and/or binary values.

Regarding embedding vector generators, typically an embedding vector generator accepts input content (e.g., an image, video, or multi-item content), processes the input content through various levels of convolution, and produces an array of values that specifically reflect on the input data, i.e., an embedding vector. Due to the nature of a trained embedding vector generator (i.e., the convolutions that include transformations, aggregations, subtractions, extrapolations, normalizations, etc.), the contents or values of the resulting embedding vectors are often meaningless to a personal examination. However, collectively the elements of an embedding vector can be used to project or map the corresponding input content into an embedding space as defined by the embedding vectors.

As indicated above, two embedding vectors (generated from the same content type by the same embedding vector generator) may be compared for similarity as projected within the corresponding embedding space. The closer that two embedding vectors are located within the embedding space, the more similar the input content from which the embedding vectors were generated.

Recommender services maintain a corpus of content and, in response to a request for recommended content for a subscriber, draw from the corpus to recommend one or more content items. To facilitate the identification of recommended content, a recommender service typically associates an embedding vector to each content item in the corpus of content items. Typically, recommended content is related to a current activity of a subscriber, or a prior activity of the subscriber. According to aspects of the disclosed subject matter, to identify the related content, a recommender service will generate one or more representative embedding vectors. Since a subscriber, as a person, is not "input content" for an embedding vector generator, the one or more representative embedding vectors are instead based on the content items of the recommender service's corpus with which the subscriber has interacted. Indeed, according to aspects of the disclosed subject matter, embedding vectors of the content items with which the subscriber has interacted can be used to generate one or more representative embedding vectors, which representative embedding vectors can then be used to identify recommended content.

Figure 1B:
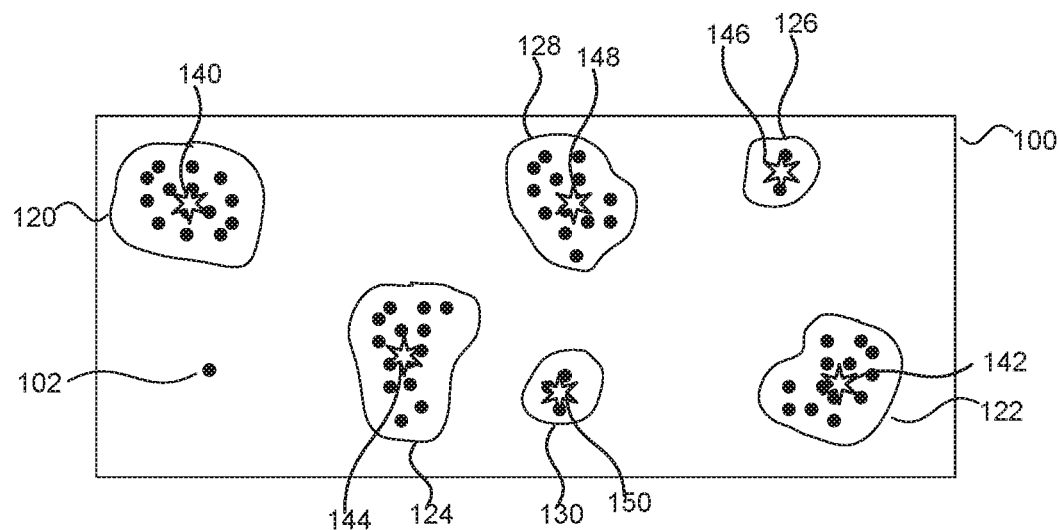

While a single representative embedding vector may be used, in various embodiments of the disclosed subject matter, a plurality of representative embedding vectors for each subscriber can provide improved results in recommending content to the subscriber. To further illustrate, reference is now made to FIGS. 1A and 1B. FIGS. 1A and 1B are pictorial diagrams illustrating advantages of using multiple embedding vectors, i.e., representative embedding vectors, in an embedding space in recommending content to an online service's subscriber, according to aspects of the disclosed subject matter. Indeed, both FIGS. 1A and 1B show a portion of a content item embedding space 100. This illustrative embedding space 100 further shows various projections as black dots, including projections of content items 102-112 with which a subscriber has previously interacted (or is currently interacting). By way of illustration and example, the projections are, generally, clustered together. This is a typical, though simplified, illustration of a subscriber's activities with content items, indicating that the subscriber may have multiple interests and interacts with content items in that interest.

Assuming, for illustration and exemplary purposes, that the projections represent all content items of the subscriber's prior (and current) activities, a representative embedding vector can be generated. In this example, the star 114 of FIG. 1A represents the representative embedding vector as an average of the embedding vectors of the projected content items. With only one representative embedding vector, identifying a close content item to the interests of the subscriber as a recommended content item may result in identifying a content item that projects near to projection 112. Of course, a content item near projection 112 would only correspond to a single interest of the subscriber. In fact, an averaged, single representative embedding vector may just as likely be projected to a location within the embedding space that is far away for any actual cluster of subscriber interests.

To improve the accuracy of recommending content to the subscriber, and according to additional aspects of the disclosed subject matter, the projections of content items with which the subscriber has interacted are clustered into a plurality of clusters. In various embodiments of the disclosed subject matter, a clustering process may generate at least a threshold minimum number of clusters. FIG. 1B illustrates that a clustering process has clustered the projections of content items into a plurality of clusters, including clusters 120-130. Each cluster is viewed as an interest cluster of the subscriber. Additionally, and according to further aspects of the disclosed subject matter, a representative embedding vector is generated for each cluster, as represented by stars 140-150. In some embodiments of the disclosed subject matter, a representative embedding vector is generated as a centroid or averaged embedding vector of the content items projected within the cluster. In other embodiments of the disclosed subject matter, centroids may be found for each cluster after which the embedding vector of the closest content item within the cluster to the centroid is adopted as the representative embedding vector for the interest cluster. With multiple representative embedding vectors, a recommender service can select a first representative embedding vector corresponding to an interest cluster, identify a content item that is projected in close proximity to the first representative embedding vector, and return the identified content item as a recommended content item to the subscriber. Advantageously, this ensures that the recommended content item is very close to at least one interest of the subscriber.

In order to recommend content to a subscriber base, a suitably configured recommender service may carry out a process that at least once or, more typically, repeatedly generates and/or updates representative embedding vectors for its subscribers. Advantageously, repeatedly, even periodically, regenerating representative embedding vectors makes sure that new or evolving interests of a subscriber are reflected in the representative embedding vectors based, at least in part, in recent activities of the subscriber with regard to content items of the service's corpus of content items.

Figure 2:
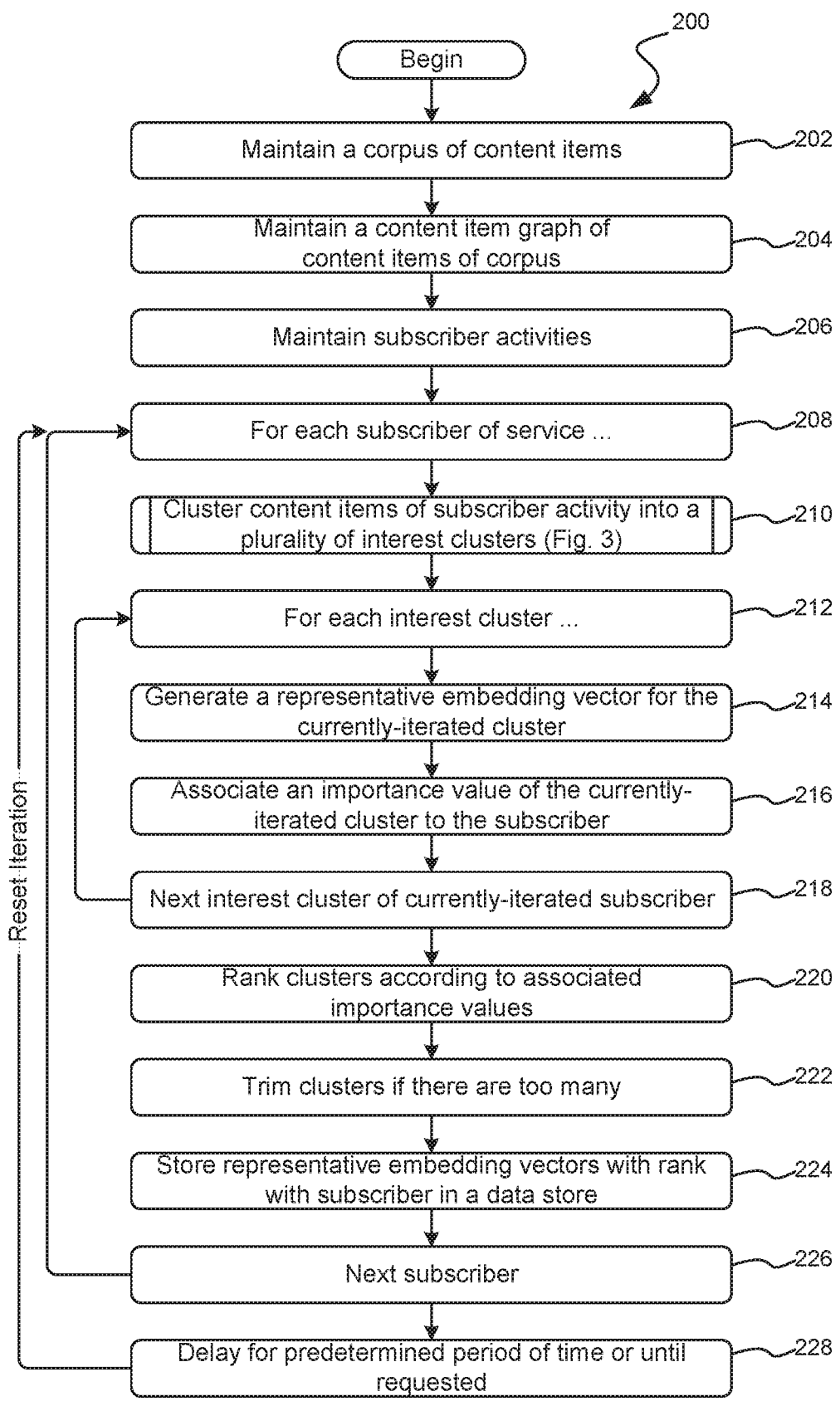
FIG. 2 is a flow diagram illustrating an exemplary routine for determining a plurality of representative embedding vectors of subscribers according to the behaviors of the subscribers with a plurality of content items, in accordance with aspects of the disclosed subject matter.

To further illustrate the process of generating representative embedding vectors for subscribers, reference is now made to FIG. 2. FIG. 2 is a flow diagram illustrating an exemplary routine 200 for determining a plurality of representative embedding vectors of subscribers according to the behaviors of the subscribers with a plurality of content items, in accordance with aspects of the disclosed subject matter. Beginning at block 202, a corpus of content items is maintained by the recommender service. This corpus of content items includes those content items that are the subject matter of the subscriber behaviors. According to aspects of the disclosed subject matter, the content items of the corpus of content items are associated with an embedding vector that logically projects the content item into a content item embedding space, such as content item embedding space 100 of FIGS. 1A and 1B.

At block 204, in addition to maintaining a corpus of content items, a content item graph is also maintained. According to aspects of the disclosed subject matter, the content item graph includes nodes and edges, where each node corresponds to a content item of the corpus of content items, and an edge represents a relationship between two nodes corresponding to two distinct content items of the content graph. There may be multiple bases for relationships between content items which include, by way of illustration and not limitation, co-occurrence within a collection of content items, commonality of ownership of content items, user engagement of content items, similarity of content items, and the like.

In addition to maintaining a corpus of content items with associated embedding vectors and the content item graph, at block 206 the recommender service also maintains subscriber activities in a data store. More particularly and according to various aspects of the disclosed subject matter, the recommender service maintains records or a history of the behaviors and/or activities of its subscribers with regard to the content items of the corpus of content items, including (by way of illustration and not limitation) the extent and nature of subscriber interaction with a content item, as well as the date and time of these subscriber interactions.

With both a corpus of content items and a record or history of subscriber behaviors with regard to the content items of the corpus, at block 208 an iteration loop is begun to iterate through the subscribers of the recommender service. For description purposes, for routine 200 the term "the currently-iterated subscriber" refers to a subscriber that is currently being processed as part of the iteration of subscribers.

At block 210, the content items that are the subject of the currently-iterated subscriber's behaviors are identified and clustered to form a plurality of interest clusters for that subscriber. Identifying and clustering these content items for the currently-iterated subscriber to form a plurality of interest clusters is described in greater detail in regard to routine 300 of FIG. 3.

Figure 3:
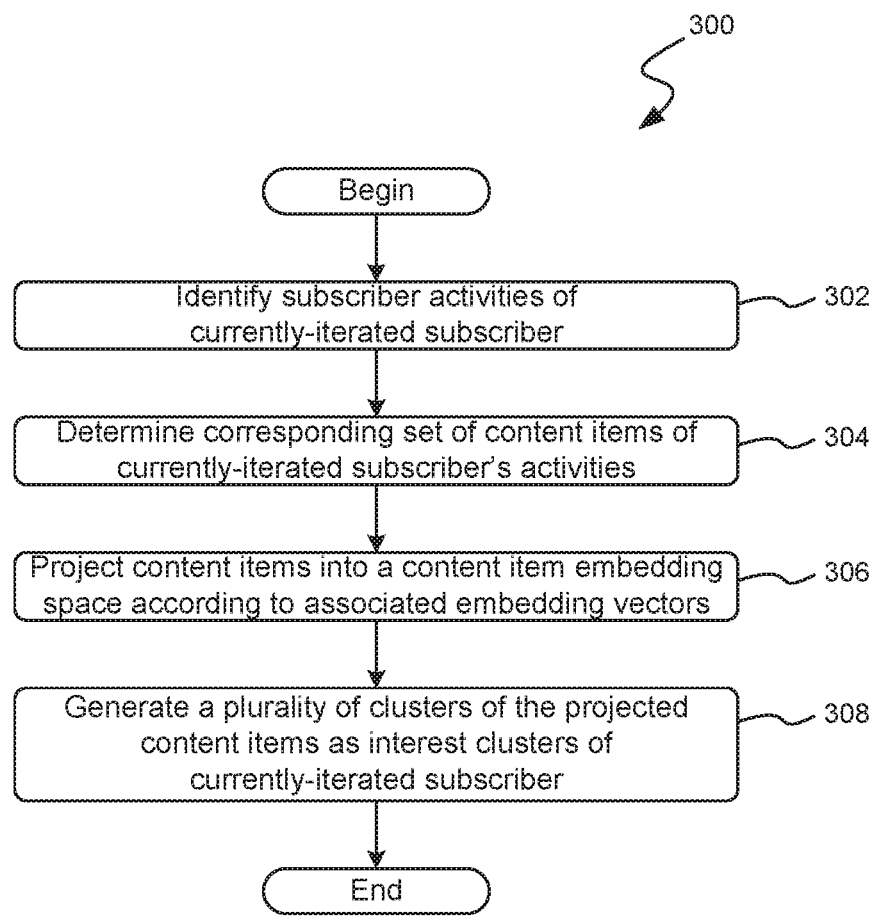
FIG. 3 is a flow diagram illustrating an exemplary routine 300 for generating interest clusters of the subscriber according to the subscriber's actions with content items maintained by the recommender service, in accordance with aspects of the disclosed subject matter.

Turning to FIG. 3, as indicated, FIG. 3 is a flow diagram illustrating an exemplary routine 300 for generating interest clusters of the subscriber according to the subscriber's actions with content items maintained by the recommender service, in accordance with aspects of the disclosed subject matter. To begin, at block 302, at least some of the currently-iterated subscriber's activities are identified. According to aspects of the disclosed subject matter, the identified activities correspond to the currently-iterated subscriber's activities within a most-recent time period. Advantageously, by selecting subscriber's activities within a most-recent time period the interest clusters that are generated tend to reflect the most-recent actual interests of the currently-iterated subscriber, recognizing that interests evolve and change over time and that a subscriber's current interests are often more important than previous interests. According to various embodiments of the disclosed subject matter, the most-recent time period may correspond to a predetermined number of days, or weeks, or months. Additionally or alternatively, the most-recent time period may be determined as a function of the activity level of the currently-iterated subscriber, such that the actual length of the most-recent time period is shorter (or longer) depending on the number of prior subscriber activities. In other embodiments, the most-recent time period may be determined according to a seasonal, festival, or holiday time period in which subscriber activities may reflect the current season/holiday/festival and some time period leading up to the same.

At block 304, the set of content items that were the subject matter of the currently-iterated subscriber's prior activities are identified. According to aspects of the disclosed subject matter, subscriber activities will typically include a content item of the corpus of content items. However, it should be appreciated that there may be subscriber activities that do not include a content item, and there may also be subscriber activities that include a plurality of content items.

At block 306, the content items of the set of content items are logically projected into the content item embedding space, such as (for illustration purposes) the content item projections, including projections of content items 102-112, into embedding space 100 as illustrated in FIG. 1A. At block 308, the content items of the set of content items are clustered according to their projections within the content item embedding space 100. By way of illustration, the content item projections of FIG. 1A are clustered into six distinct clusters 120-130. According to various embodiments of the disclosed subject matter, these clusters may be generated according to various clustering algorithms or models that include, by way of illustration and not limitation, centroid models (e.g., a k-means clustering algorithm), density models (e.g., DBSCAN or OPTICS clustering algorithms), neural models (e.g., principal component analysis or independent component analysis algorithms), and the like. According to various embodiments of the disclosed subject matter, a clustering of the projected content items may result in some projected content items that are "alone," such as projected content item 102. In various embodiments, these solo content items may be viewed as single-item clusters or, alternatively, ignored as being irrelevant for purposes of identifying interest clusters of the currently-iterated subscriber. The results of clustering the projected content items is a set of interest clusters of the currently-iterated subscriber of the most-recent time period. Thereafter, the routine 300 terminates.

With reference back to routine 200, after generating the interest clusters from the set of content items of the currently-iterated subscriber's activities with the recommender service, at block 212 another iteration loop is begun, this iteration loop to iterate through each of the identified/generated interest clusters. At block 214, a representative embedding vector is generated for the currently-iterated interest cluster. According to non-limiting aspects of the disclosed subject matter, a representative embedding vector may be determined as a centroid or averaged embedding vector of the embedding vectors of the content items projected within the currently-iterated interest cluster. Weightings may be applied to the various embedding vectors during the determination of the centroid based on the number of occurrences that any given content item is projected into the currently-iterated interest cluster during the most-recent time period. In various embodiments, the centroid is viewed as the representative embedding vector of the currently-iterated interest cluster.

In an alternative embodiment, after determining a centroid for the currently-iterated interest cluster, the closest projected content item within the interest cluster is identified and the embedding vector of that closest projected content item is used as the representative embedding vector of the currently-iterated interest cluster. Advantageously, this ensures that the representative embedding vector projects to an actual content item which, in turn, adds processing efficiencies to identifying nearby/related content for recommending a content item. Advantageously, having the representative embedding vector projecting/corresponding to an actual content item within the embedding space 100 facilitates matching subscribers with similar interests.

After determining the representative embedding vector for the currently-iterated interest cluster, at block 216 an importance value is determined for the currently-iterated interest cluster. According to aspects of the disclosed subject matter, this importance value is determined according to a variety of factors including, by way of illustration and not limitation, the number of content items represented in the interest cluster, the frequency that a content item within the interest cluster was repeatedly accessed in the most-recent time period through activity of the currently-iterated subscriber, the overall percentage of content items in the currently-iterated interest cluster in view of all content items of the set of content items for the currently-iterated subscriber, whether this currently-iterated interest cluster corresponded to a prior interest cluster of the currently-iterated subscriber, the overall popularity of the content items represented in the currently-iterated interest cluster among all subscribers of the recommender service, and the like.

After determining the representative embedding vector and interest value for the currently-iterated interest cluster, at block 218 if there are more interest clusters to process, the routine 200 returns to block 212. Alternatively, once all interest clusters for the currently-iterated subscriber have been processed, the routine 200 proceeds to block 220.

At block 220, the interest clusters for the currently-iterated subscriber are ranked according to, at least in part, the importance values to the currently-iterated subscriber. Additional factors that may be included in the ranking of the interest clusters of the currently-iterated subscriber may include whether the interest cluster is a prior interest cluster of the subscriber, popularity of the content items of the interest cluster, and the like.

After ranking the interest clusters, at block 222, the interest clusters for the currently-iterated subscriber are trimmed or limited to a predetermined threshold number. This trimming is made according to the ranking of the interest clusters and results in the least important interest clusters to the currently-iterated subscriber being removed. Limiting or trimming the interest clusters to a predetermined maximum number is, primarily, a processing efficiency measure resulting from the recommender service maintaining, at a maximum, a predetermined number of interest clusters for each subscriber. An exemplary maximum number is twelve, though more or fewer may be advantageously used.

At block 224, the remaining representative embedding vectors, along with their rank, are saved in a data store in association with the currently-iterated subscriber. At block 226, if there are additional subscribers to process, the routine 200 returns to block 208 to process the next subscriber as described above. Alternatively, if the subscribers have been processed, the routine 200 proceeds to block 228.

At block 228, the process of generating representative embedding vectors for the subscribers of the recommender service is delayed. The period of delay may correspond to the amount of time used in determining the most-recent time period, a predetermined time period, and/or coincided with periodic updates. After this delay, the routine 200 returns to the iteration of block 208, resetting the iteration such that the recommender service's subscribers are again processed.

As can be seen, routine 200 is described as an ongoing process that repeatedly updates the representative embedding vectors of the recommender service's subscribers. It should be appreciated that this may be a process/routine that is run as a background process that is asynchronous to other processes of the recommender service. Additionally, this routine 200 may be implemented as a single process (with a terminus instead of block 228 to replace the delay and return to re-process the subscribers) that is executed once or repeatedly as determined by the recommender service.

Figure 4:
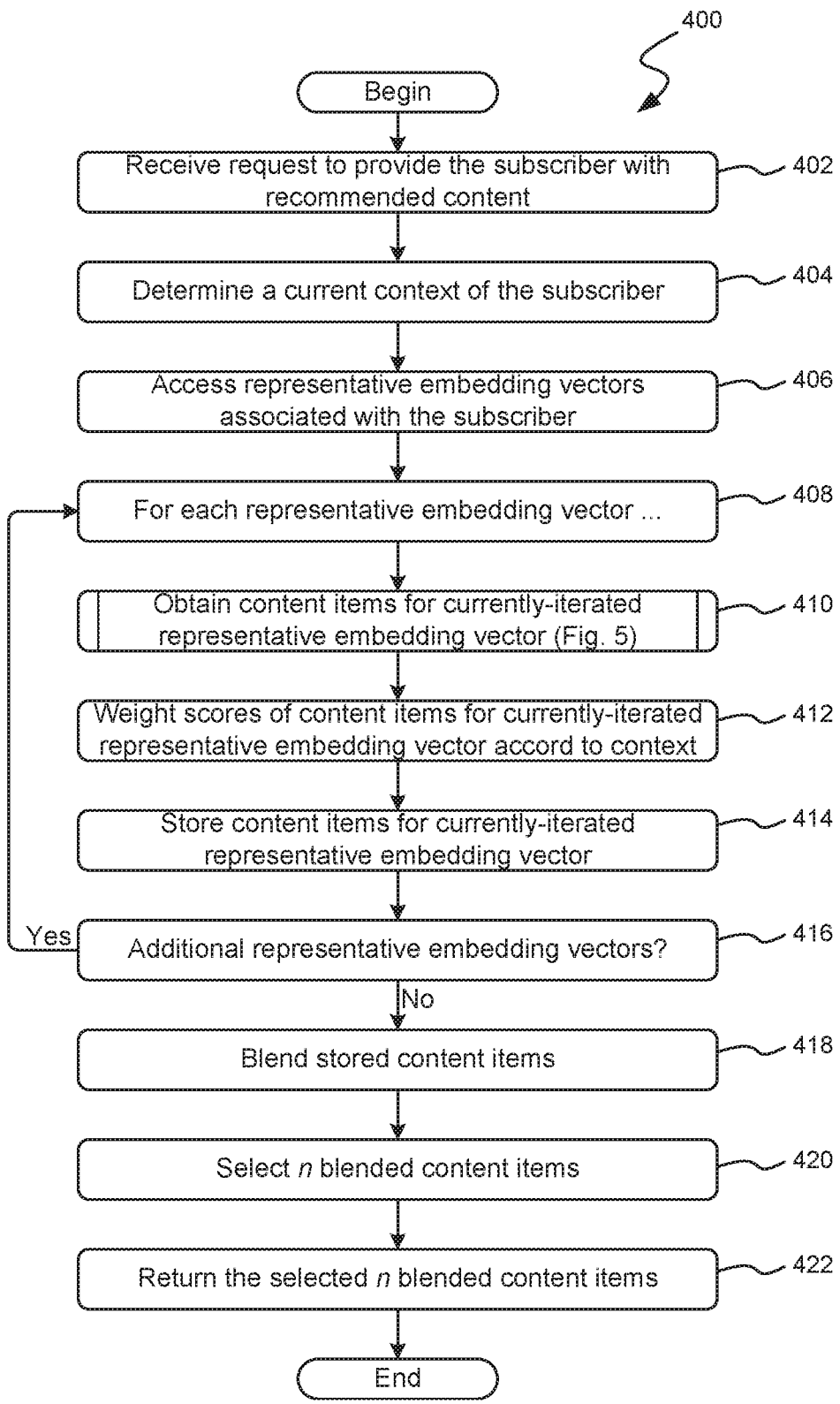
FIG. 4 is a flow diagram illustrating an exemplary routine for responding to a subscriber's request for recommended content in accordance with aspects of the disclosed subject matter.

Having established that representative embedding vectors are generated for a recommender service's subscribers, reference is now made to making recommendations to a subscriber in response to a request. FIG. 4 is a flow diagram illustrating an exemplary routine 400 for responding to a subscriber's request for recommended content, in accordance with aspects of the disclosed subject matter.

Beginning at block 402, a request is received to provide a subscriber of the recommender service with recommended content. In various embodiments, this may be an explicit request from the subscriber or an implicit request according to actions of the subscriber with the recommender service. In some instances, the request may also indicate one or more content items with which the requesting subscriber is interacting.

At block 404, a current context of the requesting subscriber is determined. This current context may include, by way of illustration and not limitation, information about the nature of the request (e.g., explicit or implicit), one or more current content items with which the subscriber is interacting, explicit and/or implicitly identified interests of the subscriber, the capabilities of the device from which the subscriber generated the request, and the like.

At block 406, the representative embedding vectors associated with the requesting subscriber are accessed. At block 408, an iteration loop is begun to iterate through one or more representative embedding vectors associated with the subscriber to generate, for each of the one or more representative embedding vectors, a set of content items that represent candidate recommended content items for the subscriber. Of course, in various embodiments, this iteration loop may process all representative embedding vectors associated with the subscriber, or some portion less than all of the representative embedding vectors.

At block 410, as part of the iteration and with regard to a currently-iterated representative embedding vector of the subscriber, a set of content items is obtained. Obtaining a set of content items (as potential recommended items) based on a representative embedding vector is described in greater detail below in regard to routine 500 of FIG. 5.

Figure 5:
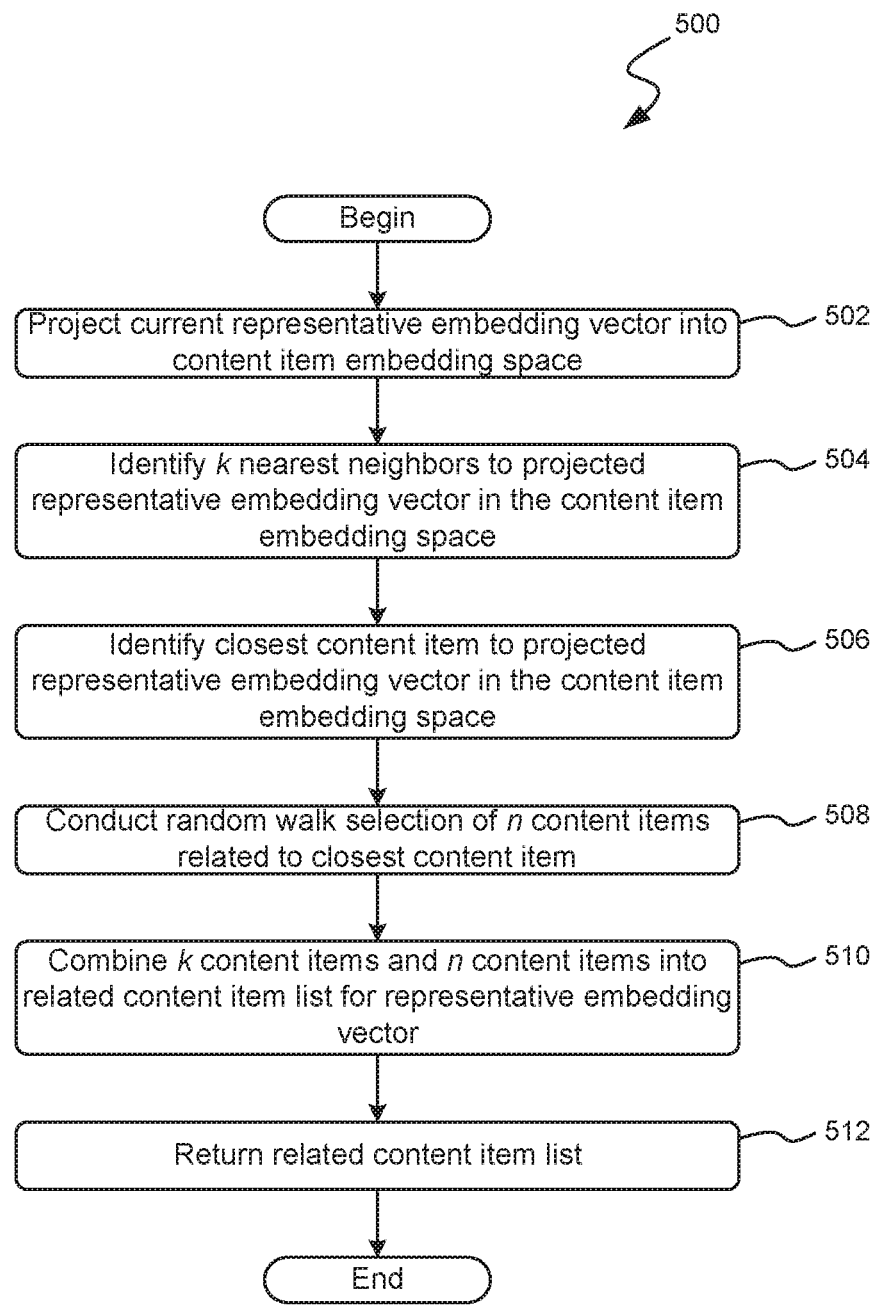
FIG. 5 is a flow diagram illustrating an exemplary routine suitably configured for generating a set of related content items for a representative embedding vector in accordance with aspects of the disclosed subject matter.

Turning to FIG. 5, FIG. 5 is a flow diagram illustrating an exemplary routine 500 suitably configured for generating a set of content items for a representative embedding vector of a subscriber, in accordance with aspects of the disclosed subject matter. More particularly, routine 500 illustrates two exemplary, but non-exclusive techniques for identifying a set of content items for a representative embedding vector of a subscriber. Additional and/or alternative processes for identifying content items from a corpus of content items according to a representative embedding vector of a subscriber may also be used.

Beginning at block 502, the representative embedding vector is projected into the content item embedding space.

At block 504 and according to various embodiments of the disclosed subject matter, a first set of k content items is identified based on the projection of the representative embedding vector into the content item embedding space. The k content items of this first set of content items are selected from the corpus of content items and identified or selected as a function of a distance measurement between the currently-iterated representative embedding vector and content items of the corpus of content items, as projected into the content item embedding space. More particularly, a set of k content items whose projection into the content item embedding space are closest, according to the distance measurement, to the projection of the representative embedding vector are selected. In various embodiments of the disclosed subject matter, the distance measurement of embedding vectors is a cosine similarity measure. Additionally, and according to further aspects of the disclosed subject matter, the first set of content items may be selected such that they do not include content items that were part of any of the requesting subscriber's interest clusters. While the value of k may correspond to any particular number as may be viewed as a good representation of close content items, in various non-limiting embodiments the value of k may be twenty (20). Of course, in alternative embodiments, the value of k may be higher or lower than twenty (20).

At block 506, the content item closest to the projected representative embedding vector in the content item space is identified. According to aspects of the disclosed subject matter, instead of the representative embedding vector simply pointing (as projected into the content item embedding space) to a centroid of a cluster where no content item is located, in various embodiments the representative embedding vector is updated to point to the nearest content item within the subscriber's interest cluster. Advantageously, this up-front processing, i.e., updating the representative embedding vector to point to an actual content item in the interest cluster, results in a savings in computation and data processing to determine, at the time of recommending content, the closest content item to the projected representative embedding vector for the interest cluster.

At block 508 and according to additional and/or alternative aspects of the disclosed subject matter, after having identified the closest content item to the projected representative embedding vector in the content item embedding space, a random-walk selection of content items within a content item graph is made to identify n content items within a second set of content items. The start of this random-walk selection is the closest content item to the projected representative embedding vector for the interest cluster determined in block 506.

As described in greater detail in co-pending and commonly assigned U.S. patent application Ser. No. 16/101,184, filed Aug. 10, 2018, and according to aspects of the disclosed subject matter, a random-walk selection relies upon the frequency and strength of edges between nodes in a content item graph, where each edge corresponds to a relationship between two content items. As will be appreciated by those skilled in the art, a "relationship" between two content items in a content item graph represents a relationship between the two content items, such as, by way of illustration and not limitation, co-occurrence within a collection, common ownership, frequency of access, and the like.

A random-walk selection utilizes random selection of edge/relationship traversal between nodes (i.e., content items) in the content item graph, originating at the closest content item to the projected representative embedding vector. This random traversal is performed in a manner that limits the distance/extent of relevant content items by resetting back to the original content item. Further, this random-walk selection relies upon frequency and strength of the various edges to ultimately identify the second set of n content items of the content item graph. In this manner, content items close to the original content item that have stronger relationships in the content item graph are more likely included in the second set of content items. While the value of n may correspond to any particular number as may be viewed as a good representation of close content items, in various non-limiting embodiments the value of n may be twenty-five (25). Of course, in alternative embodiments, the value for n may be higher or lower than twenty-five (25).

At block 510, the k content items of the first set of content items and then content items of the second set of content items are combined into a related content item list for the representative embedding vector. According to various aspects of the disclosed subject matter, the combining process may include removing multiple instances of the same content item in the related content item list. Additionally, the combining process may include retaining only those content items that are new to the subscriber or not-recently engaged with by the subscriber, thereby ensuring that the recommended content items are not common to the subscriber.

According to aspects of the disclosed subject matter, each content item of the related content item list is associated with a score indicating its relevance to the representative embedding vector, either by distance within the content item embedding space or by relatedness in the content item graph, such that the content items of the list may be ordered. At block 512, the related content item list is returned. Thereafter, routine 500 terminates.

Returning again to routine 400 of FIG. 4, at block 412, the relevance scores of the content items in the obtained set of content items for the currently-iterated representative embedding vector may be optionally weighted according to importance of the interest cluster of the currently-iterated representative embedding vector, and/or according to the current context of the subscriber. Additionally, random application weighting to one or more content items in the obtained set of content items may be applied to broaden the ultimate selection of recommended content items for the subscriber.

At block 414, the obtained set of content items of the currently-iterated representative embedding vector is temporarily stored for later combination with content items of other sets of content items (generated according to the other representative embedding vectors associated with the subscriber) and in the selection of recommended content for the subscriber.

At block 416, a determination is made as to whether there are additional representative embedding vectors of the subscriber to process. If there are, the process 400 returns to block 408 where a next representative embedding vector is selected as the currently-iterated representative embedding vectors and processed to generate a corresponding set of content items, as described above. Alternatively, if all representative embedding vectors have been processed, the routine 400 proceeds to block 418.

At block 418, the sets of content items that have been temporarily stored are blended together to form a blended set of content items. Blending these sets of content items together may include removing duplicate content items from within the blended set of content items. This blended set of content items corresponds to creating an ordered list of new or not-recently-interacted with content items from the corpus of content items. Additionally, in the case of duplicate content items and to reflect an implied importance of a content item that would be duplicated in the blended set, the scores of the remaining content items that were duplicates may be increased. Additionally, current contextual information of the subscriber, if not already factored into the order of the content items in the blended set of content items, may be used to weight (either positively or negatively) some of all of the content items.

After blending the content items into the blended set of content items, at block 420, a set of n content items is selected from the blended set as recommended content for the subscriber. Typically, though not exclusively, the highest scoring content items in the blended set of content items are selected. In some instances, one or more content items in the blended set of content items that are not the highest scoring content items may be also, or alternatively selected in order to provide some randomization to the content items that may be presented to the subscriber as recommended content.

According to various embodiments of the disclosed subject matter, the value or number of "n" content items may be any predetermined number that may be viewed as suitable. By way of illustration and not limitation, in some embodiments the number n corresponds to five (5) recommended content items. Of course, in alternative embodiments (and/or depending on display criteria, the number n of recommended content items may be higher or lower than five (5). Further, the value of n may be a function of the particular context of the subscriber in interacting with the recommender service. For example, conditions in which the number n may vary include, by way of illustration and not limitation, whether the subscriber is looking at a particular content item of the corpus of content items, whether the subscriber is viewing his/her "homepage" with the recommender service, and/or whether the subscriber is actively requesting related and/or recommended content items of a particular subject.

After selecting the n content items from the blended set of content items, as recommended content items for the subscriber, at block 422 the recommended content items are provided to the subscriber. Thereafter, the routine 400 terminates.

Figure 6:
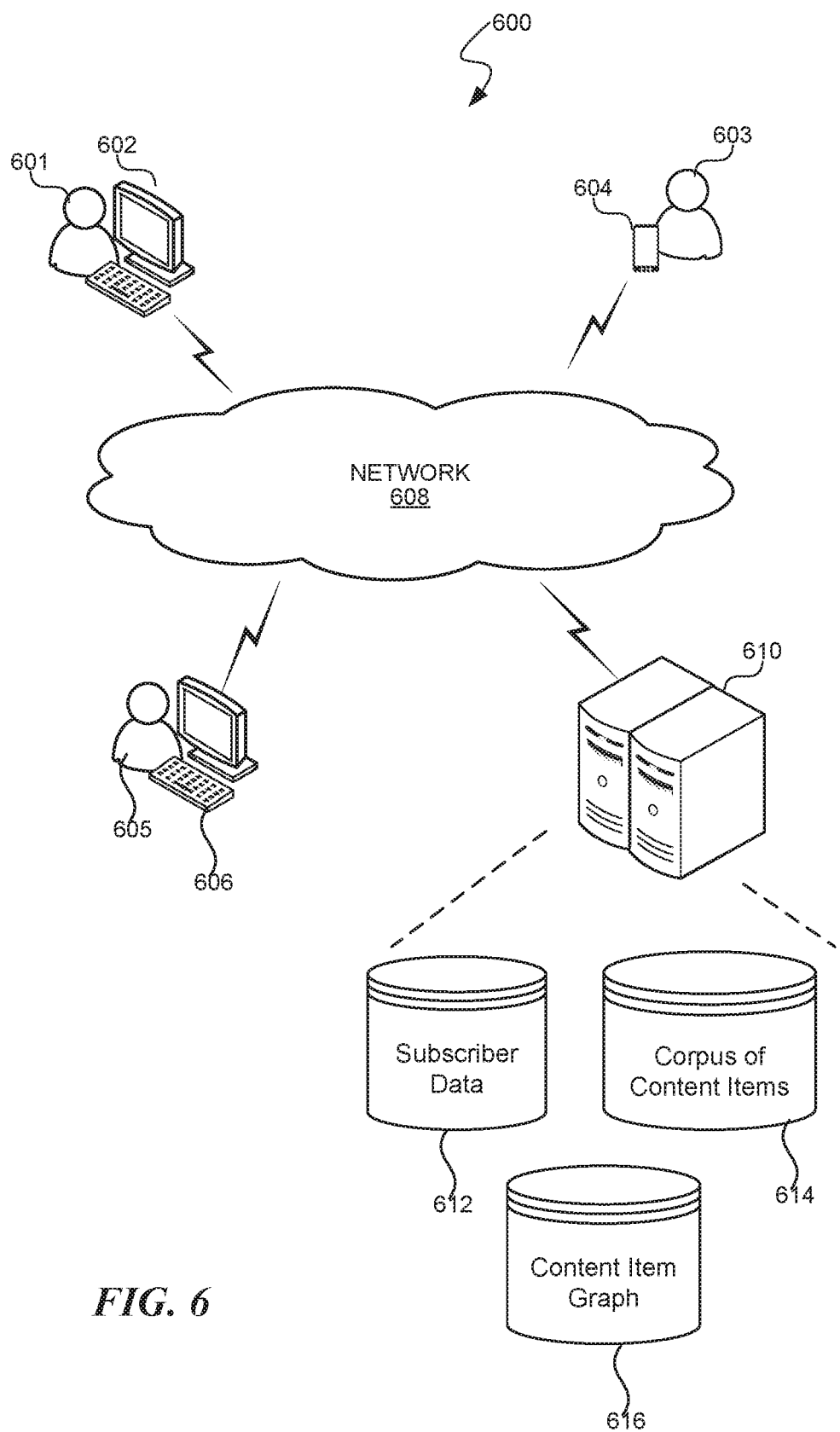
FIG. 6 is a block diagram illustrating an exemplary networked environment suitable for implementing aspects of the disclosed subject matter.

Turning now to FIG. 6, FIG. 6 is a block diagram illustrating an exemplary networked environment 600 suitable for implementing aspects of the disclosed subject matter. The exemplary networked environment includes computer users 601, 603 and 605 connected via computers and/or computing devices, such as devices 602, 604 and 606, to a network 608. For purposes of disclosure, computer users 601, 603 and 605 may each be a subscriber of a recommender service.

The network 608 is a computer network, synonymously referred to as a data network. As those skilled in the art will appreciate, the computer network 608 is fundamentally a telecommunications network over which computers, computing devices such as computing devices 602, 604 and 606, and other network-enabled devices and services can electronically communicate, including exchanging information and data. In computer networks, networked computing devices are viewed as nodes in the network. Thus, in the exemplary networked environment 600, computing devices 602, 604 and 606, as well as recommender service 610 are nodes of the network 608.

In communicating with other devices and/or services over the network 608, connections between nodes are conducted using either cable media (physical, wired connections), wireless media (wireless connections) or both. While a well-known computer network is the Internet, the disclosed subject matter is not limited to the Internet. Indeed, elements of the disclosed subject matter may be suitably and satisfactorily implemented on wide area networks, local area networks, enterprise networks, and the like.

By way of additional definition, the recommender service 610 is a network-accessible service that typically provides various services, application programming interfaces (APIs), processes and functions to its subscribers including a facility for recommending content to a subscriber in response to a request. For illustration purposes, we can assume that computer users 601, 603 and 605 are subscribers of the recommender service 610.

As shown in FIG. 6, the recommender service 610 includes a data store storing subscriber data 612, a data store storing a corpus of content items 614, and a data store storing a content item graph 616 showing relationships between content items of the corpus of content items. Of course, this particular arrangement is a logical arrangement of data stores. Indeed, in various embodiments, the data stores hosting the subscriber data 612, the corpus of content items 614, and the content item graph 616 may be the same actual data store. Alternatively, there may be multiple data stores hosting the described data: subscriber data, content item graph, and corpus of content items. Accordingly, the illustrated arrangement of computers and storage devices should be viewed as illustrative and not limiting.

In operation, computer user 601, being a subscriber of the recommender service 610, may interact with one or more items of content of the recommender service. In the course of interacting with the recommender service 610 and/or interacting with content items of the recommender service, a request for recommended content may be issued. This request may be an explicit request of the subscriber over the network 608, an implicit request initiated by actions or activities of the subscriber with the recommender service 610, and/or a request generated by the recommender service to provide the subscriber with additional content items.

In response to the request, the recommender service identifies the plurality of representative embedding vectors generated for the subscriber based on the subscriber's activities, selects a representative embedding vector of the plurality of representative embedding vectors, identifies at least one content item closest to the representative embedding vector that is "new" to the subscriber (i.e., that the subscriber has not previously interacted with, at least not in the most-recent time period), and includes the recommended content item in a communication with the subscriber/computer user 601 over the network 608.

Regarding routines 200, 300, 400 and 500 described above, as well as other routines and/or processes described or suggested herein, while these routines/processes are expressed in regard to discrete steps, these steps should be viewed as being logical in nature and may or may not correspond to any specific, actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing system described in FIG. 8 below. Additionally, in various embodiments, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer-executable instructions stored by computer-readable media, also referred to as computer readable storage media, which (for purposes of this disclosure) are articles of manufacture. As those skilled in the art will recognize, computer readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer-readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer-readable media expressly excludes carrier waves and/or propagated signals.

Figure 7:
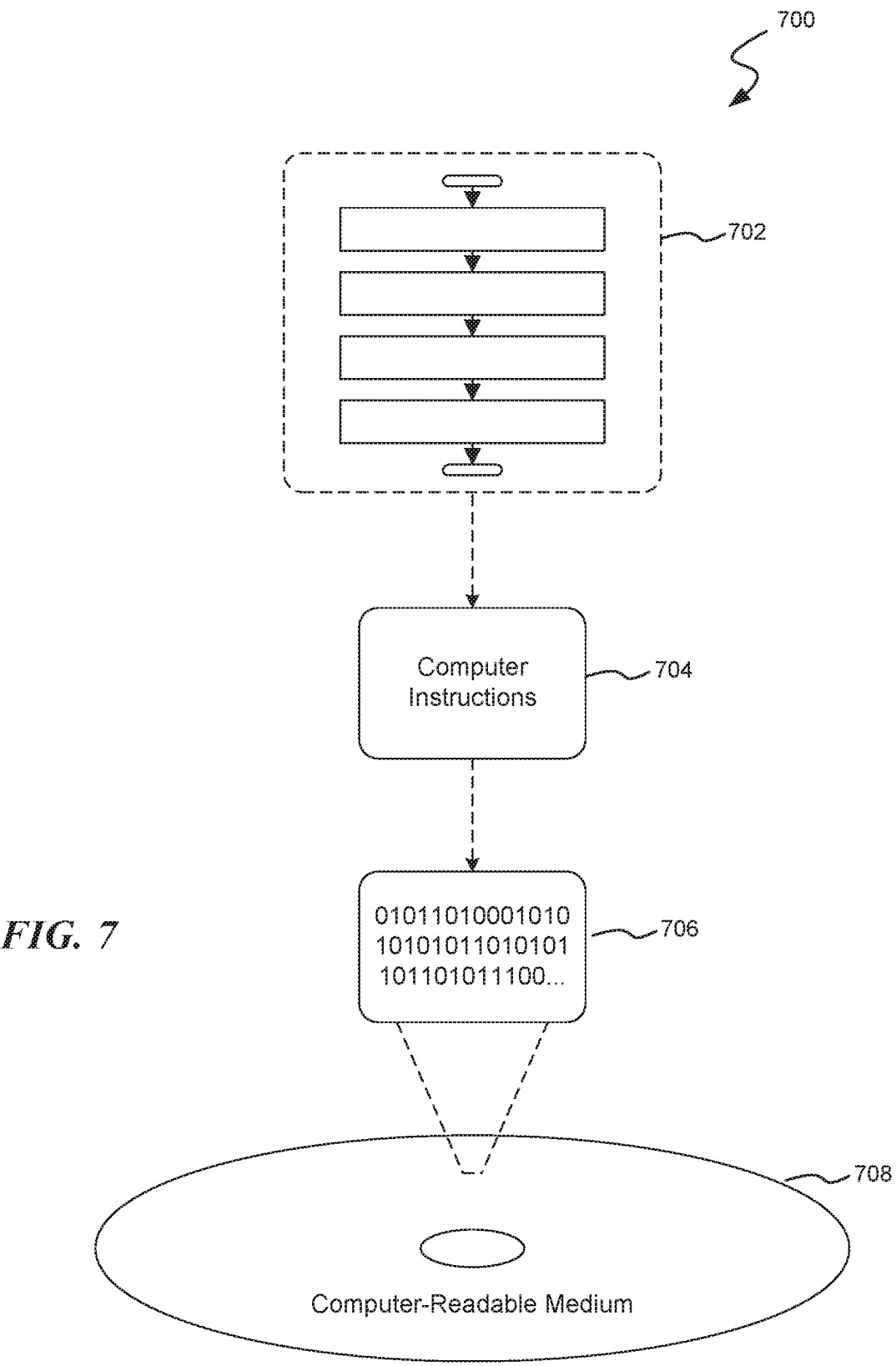
FIG. 7 is a block diagram illustrating an exemplary computer-readable medium encoded with instructions for responding to a subscriber's request for recommended content, formed in accordance with aspects of the disclosed subject matter.

Regarding computer-readable media, FIG. 7 is a block diagram illustrating an exemplary computer-readable medium bearing instructions for generating a plurality of representative embedding vectors for a subscriber based on the subscriber's behaviors and/or actions with content items, and in making recommendations of content items to the subscriber, in accordance with aspects of the disclosed subject matter. More particularly, the illustrated implementation 700 comprises a computer-readable medium 708 (e.g., a CD-R, DVD-R or a platter of a hard disk drive), on which is encoded computer-readable data 706. This computer-readable data 706 in turn comprises a set of processor-executable instructions 704 configured to operate according to one or more of the principles set forth herein. In one such embodiment 702, the processor-executable instructions 704 may be configured to perform a method, such as at least some of exemplary routines 200, 300, 400 and 500, for example. In another such embodiment, the processor-executable instructions 704 may be configured to implement a system on a computing system or device, such as at least some of the exemplary, executable components of computing system 800 of FIG. 8, as described below. Many such computer-readable media may be devised, by those of ordinary skill in the art, which are configured to operate in accordance with the techniques presented herein.

Figure 8:
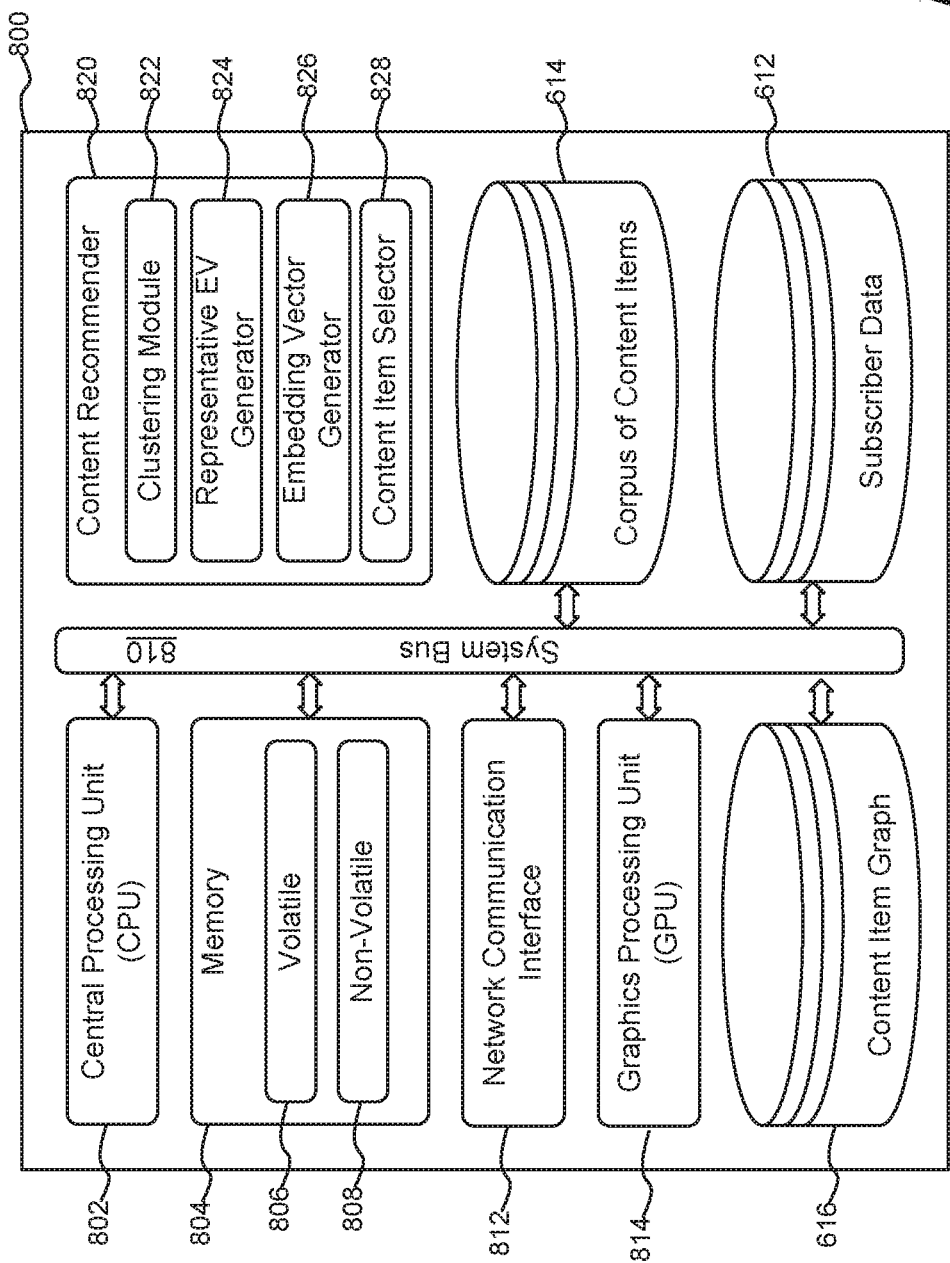
FIG. 8 is a block diagram of a computing system suitably configured to implement aspects of a recommender service, including responding to a subscriber's request for recommended content in accordance with aspects of the disclosed subject matter.

Turning to FIG. 8, FIG. 8 is a block diagram illustrating exemplary components of a computing system 800 suitably configured to implement at least some aspects of a recommender service 610, including responding to a subscriber's request for recommended content, in accordance with aspects of the disclosed subject matter. The computing system 800 typically includes one or more central processing units (or CPUs), such as CPU 802, and further includes at least one memory 804. The CPU 802 and memory 804, as well as other components of the computing system, are typically interconnected by way of a system bus 810.

As will be appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 can store (or persist) information even when a power supply is not available. In general, RAM and CPU cache memory are examples of volatile memory 806 whereas ROM, solid-state memory devices, memory storage devices, and/or memory cards are examples of non-volatile memory 808.

As will be further appreciated by those skilled in the art, the CPU 802 executes instructions retrieved from the memory 804 from computer-readable media, such as computer-readable medium 708 of FIG. 7, and/or other executable components, in carrying out the various functions of the disclosed subject matter. The CPU 802 may be comprised of any of a number of available processors, such as single-processor, multi-processor, single-core units, and multi-core units, which are well known in the art.

Further still, the illustrated computing system 800 typically also includes a network communication interface 812 for interconnecting this computing system with other devices, computers and/or services over a computer network, such as network 608 of FIG. 6. The network communication interface 812, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 812, is typically comprised of hardware and/or firmware components (and may also include or comprise executable software components) that transmit and receive digital and/or analog signals over a transmission medium (i.e., the network 608).

The illustrated computing system 800 also frequently, though not exclusively, includes a graphics processing unit (GPU) 814. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data, including the generation of embedding vectors of content items. One or more GPUs, such as GPU 814, are often viewed as essential processing components of a computing system when conducting machine learning techniques. Also, and according to various embodiments, while GPUs are often included in computing systems and available for processing or implementing machine learning models, multiple GPUs are also often deployed as online GPU services or farms and machine learning processing farms.

Also included in the illustrated computing system 800 is a content recommender 820. As described above in regard to routine 400 of FIG. 4, a content recommender 820 is a logical, executable component of the computing system that, in execution, is configured to receive a request for recommended content for a subscriber, identify a current context of the subscriber, and identify one or more content items as recommended content items which correspond to one or more interests of the subscriber.

In identifying recommended content items for a subscriber, the content recommender 820 utilizes a content item selector 828. The content item selector 828 is configured, in execution, to select a representative embedding vector of the requesting subscriber, identify one or more content items of the corpus of content items 614 that are new to the subscriber and/or have not been the subject of behaviors or actions of the requesting subscriber, and return the identified one or more content items as the recommended content items to the requesting subscriber.

The content recommender 820 also includes an executable embedding vector generator 826. In execution on the computing system 800, the embedding vector generator 826, typically implemented as a trained, machine learning model, operates to generate an embedding vector for content items that logically project the various content items of the corpus of content items 614 into a content item embedding space, such as content item embedding space 100.

An executable clustering module 822, in execution on the computing system 800, operates to identify interest clusters of a subscriber according to the subscriber's activities and behaviors, particularly those involving one or more content items of the corpus of content items 614 and according to the behaviors and/or activities of the subscriber of a most-recent time period. Generating interest clusters of a subscriber is set forth above in regard to the discussion of routine 300 of FIG. 3. Information regarding the subscriber's activities and behaviors are accessed from data associated with the subscriber in subscriber data in data store 612 maintained by the recommender service 610.

In conjunction with the clustering module 822, an executable representative EV (embedding vector) generator 824 is used to generate a plurality of representative embedding vectors from the plurality of interest clusters generated for a subscriber, as set forth above in regard to routine 200. At least some of the representative embedding vectors are ranked and stored in association with the subscriber in the subscriber data in data store 612.

Regarding the various components of the exemplary computing system 800, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method of a recommender service for providing content item recommendations to a subscriber of the recommender service, the method comprising:
    determining a plurality of clusters of content items in a corpus of content items according to a plurality of prior activities of the subscriber, the corpus of content items being associated with a content item graph that includes a plurality of nodes, wherein each of the plurality of nodes corresponds to a content item of the corpus of content items;
    generating a representative embedding vector for each of the plurality of clusters of content items and associating each representative embedding vector with the subscriber;
    in response to a request to provide a recommended content item from the corpus of content items to the subscriber:
        obtaining a set of content items for each of the representative embedding vectors associated with the subscriber;
        blending the sets of content items to generate a blended set of content items for the subscriber;
        selecting one or more content items from the blended set of content items for the subscriber; and
        presenting the one or more selected content items to the subscriber as recommended content.

2. The computer-implemented method of claim 1, wherein determining the plurality of clusters of content items in the corpus of content items according to the plurality of prior activities of the subscriber comprises:
    identifying a second set of content items of the corpus of content items that were a subject of the plurality of prior activities of the subscriber; and
    determining the plurality of clusters of content items from the identified second set of content items according to a similarity measure between the content items of the identified second set of content items.

3. The computer-implemented method of claim 2, wherein each content item of the corpus of content items is associated with an embedding vector that projects the associated content item into an embedding space; and
    wherein the similarity measure is determined using the associated embedding vectors of the content items from the identified second set of content items.

4. The computer-implemented method of claim 3, wherein the similarity measure comprises a cosine similarity measure.

5. The computer-implemented method of claim 1, wherein the plurality of prior activities of the subscriber comprise the plurality of prior activities of the subscriber during a most-recent predetermined time period.

6. The computer-implemented method of claim 1, wherein obtaining the set of content items for each representative embedding vector associated with the subscriber comprises:
    projecting the representative embedding vector into a content item embedding space;
    projecting embedding vectors of content items of the corpus of content items into the content item embedding space; and
    selecting the set of the content items of the corpus of content items according to a similarity measure between the projected embedding vectors of content items of the corpus of content items and the projected representative embedding vector.

7. The computer-implemented method of claim 1, wherein obtaining the set of content items for each representative embedding vector associated with the subscriber comprises:
    identifying an originating content item of the corpus of content items according to the representative embedding vector;
    conducting a random-walk selection from the originating content item of the corpus of content items as represented in the content item graph; and
    selecting the set of content items corresponding to a plurality of highest scoring nodes in the content item graph resulting from the random-walk selection.

8. The computer-implemented method of claim 7, wherein a first representative embedding vector of the representative embedding vectors associated with the subscriber is associated with a first cluster of content items of the plurality of clusters of content items and projects to a non-content item centroid of the first cluster of content items; and
    wherein the method further comprises:

identifying a closest content item of the first cluster of content items to the non-content item centroid of the first cluster of content items; and setting the originating content item of the corpus of content items as the identified closest content item of the first cluster of content items.

9. The computer-implemented method of claim 1, wherein obtaining the set of content items for each representative embedding vector associated with the subscriber comprises:

projecting the representative embedding vector into a content item embedding space;

projecting embedding vectors of content items of the corpus of content items into the content item embedding space;

selecting a first set of the content items of the corpus of content items according to a similarity measure between the projected embedding vectors of content items of the corpus of content items and the projected representative embedding vector;

identifying an originating content item of the corpus of content items according to the representative embedding vector;

conducting a random-walk selection from the originating content item of the corpus of content items as represented in the content item graph;

selecting a second set of content items corresponding to a plurality of highest scoring nodes in the content item graph resulting from the random-walk selection; and blending the first set of the content items and the second set of content items to generate the set of content items.

10. A computer-readable medium bearing computer-executable instructions which, when executed on a computing system comprising at least a processor executing the instructions, carries out a method of a recommender service for providing content item recommendations for a subscriber of the recommender service, the method comprising:

maintaining a corpus of content items, each content item of the corpus of content items being associated with an embedding vector that projects an associated content item into a content item embedding space;

maintaining a content item graph for the content items of the corpus of content items, wherein the content item graph comprises a plurality of nodes, and each node of the content item graph corresponds to a respective content item of the corpus of content items;

determining a plurality of clusters of content items of the corpus of content items based on prior activities of the subscriber with the recommender service;

generating a representative embedding vector for each of at least some clusters of the plurality of clusters of content items and associating each generated representative embedding vector with the subscriber;

in response to a request to provide a recommended content item from the corpus of content items to the subscriber:

obtaining a first set of representative embedding vectors associated with the subscriber;

obtaining a set of content items for the representative embedding vectors of the first set of representative embedding vectors;

blending the set of content items obtained for the representative embedding vectors of the first set of embedding vectors to generate a blended set of content items for the subscriber;

selecting one or more content items from the blended set of content items for the subscriber; and presenting the one or more selected content items to the subscriber as recommended content.

11. The computer-readable medium of claim 10, wherein determining the plurality of clusters of content items in the corpus of content items comprises:

identifying a second set of content items of the corpus of content items that were a subject of a plurality of prior activities of the subscriber with the recommender service; and determining the plurality of clusters of content items from the identified second set of content items according to similarity measures between the content items of the second identified set of content items.

12. The computer-readable medium of claim 11, wherein obtaining the set of content items for the representative embedding vectors comprises:

projecting the representative embedding vector into the content item embedding space;

projecting the embedding vectors of the content items of the corpus of content items into the content item embedding space;

selecting a first set of content items of the corpus of content items according to a similarity measure between the projected embedding vectors of content items of the corpus of content items and the projected representative embedding vector;

identifying an originating content item of the corpus of content items according to the representative embedding vector;

conducting a random-walk selection from the originating content item of the corpus of content items as represented in the content item graph;

selecting a second set of content items corresponding to a plurality of highest scoring nodes in the content item graph resulting from the random-walk selection; and blending the first set of content items and the second set of content items to generate the set of content items according to the representative embedding vector.

13. The computer-readable medium of claim 12, wherein a first representative embedding vector of the first set of representative embedding vectors is associated with a first cluster of content items of the plurality of clusters of content items and projects to a non-content item centroid of the first cluster of content items; and wherein the method further comprises:

identifying a closest content item of the first cluster of content items to the non-content item centroid of the first cluster of content items; and setting the originating content item of the corpus of content items as the identified closest content item of the first cluster of content items.

14. The computer-readable medium of claim 13, wherein determining the plurality of clusters of content items in the corpus of content items according to the plurality of prior activities of the subscriber comprises:

identifying a second set of content items of the corpus of content items that were a subject of the prior activities of the subscriber; and determining the plurality of clusters of content items from the identified second set of content items according to a similarity measure between the content items of the identified second set of content items.

15. The computer-readable medium of claim 14, wherein the similarity measure is determined using the associated embedding vectors of the content items from the second set of content items.

16. A computing system implementing a recommender service for providing content item recommendations in response to a request, the system comprising a processor and a memory, wherein the processor executes instructions stored in the memory as part of or in conjunction with additional components to respond to the request, and configures the computing system to at least:
   maintain a corpus of content items, each content item of the corpus of content items being associated with an embedding vector that projects an associated content item into a content item embedding space;
   maintain a content item graph for the corpus of content items, wherein the content item graph comprises a plurality of nodes, and each node of the content item graph corresponds to a content item of the corpus of content items;
   determine a plurality of clusters of content items of the corpus of content items according to a plurality of prior activities of a subscriber with the recommender service;
   generate a representative embedding vector for each of at least some clusters of a plurality of clusters of content items and associate each generated embedding vector with the subscriber; and
   in response to the request to provide a recommended content item from the corpus of content items to the subscriber:
      obtain a first set of representative embedding vectors associated with the subscriber;
      obtain a set of content items according to each representative embedding vector of the first set of representative embedding vectors;
      blend the sets of content items obtained for the first set of representative embedding vectors to generate a blended set of content items for the subscriber;
      select one or more content items from the blended set of content items for the subscriber as content item recommendations to the subscriber; and
      present the selected content item to the subscriber as a recommended content item.

17. The computing system of claim 16, wherein the computing system, in obtaining the set of content items according to each representative embedding vector of the first set of representative embedding vectors, is further configured to at least:
   project the representative embedding vector into the content item embedding space;
   project embedding vectors of the content items of the corpus of content items into the content item embedding space;
   select a first set of content items of the corpus of content items according to a similarity measure between the projected embedding vectors of content items of the corpus of content items and the projected representative embedding vector;
   identify an originating content item of the corpus of content items according to the representative embedding vector;
   conduct a random-walk selection from the originating content item of the corpus of content items as represented in the content item graph;
   select a second set of content items corresponding to a plurality of highest scoring nodes in the content item graph resulting from the random-walk selection; and
   blend the first set of content items and the second set of content items to generate the set of content items according to the representative embedding vector.

18. The computing system of claim 17, wherein the representative embedding vector is associated with a first cluster of content items of the plurality of clusters of content items and projects to a non-content item centroid of the first cluster of content items; and
   wherein the computing system is further configured to at least:
      identify a closest content item of the first cluster of content items to the non-content item centroid of the first cluster of content items; and
      set the originating content item of the corpus of content items as the identified closest content item of the first cluster of content items.

19. The computing system of claim 18, wherein the computing system, in determining the plurality of clusters of content items in the corpus of content items according to the plurality of prior activities of the subscriber, is further configured to at least:
   identify a second set of content items of the corpus of content items that were a subject of the plurality of prior activities of the subscriber; and
   determine the plurality of clusters of content items from the identified second set of content items according to a similarity measure between the content items of the identified second set of content items.

20. The computing system of claim 16, wherein the computing system, in determining the plurality of clusters of content items of the corpus of content items according to the plurality of prior activities of the subscriber, is further configured to at least:
   identify a second set of content items of the corpus of content items that were a subject of the plurality of prior activities of the subscriber with the recommender service; and
   determine the plurality of clusters of content items from the identified second set of content items according to a similarity measure between the content items of the identified second set of content items.

* * * * *